Jan. 4, 1966 H. J. KRAVIT 3,227,018

METHOD AND APPARATUS FOR PERFORATING FORM CONTROL TAPES

Filed March 9, 1964 2 Sheets-Sheet 1

INVENTOR.
HIRSH J. KRAVIT
BY
David M. Hecht
ATTORNEY

METHOD AND APPARATUS FOR PERFORATING FORM CONTROL TAPES

Filed March 9, 1964 2 Sheets-Sheet 2

INVENTOR.
HIRSH J. KRAVIT

BY

David M. Hecht

ATTORNEY

United States Patent Office 3,227,018
Patented Jan. 4, 1966

3,227,018

METHOD AND APPARATUS FOR PERFORATING FORM CONTROL TAPES

Hirsh J. Kravit, 7936 N. Fairchild Road, Fox Point, Wis.

Filed Mar. 9, 1964, Ser. No. 350,199
5 Claims. (Cl. 83—29)

This invention relates to a method and apparatus for perforating form control tapes for computing and data processing machines.

Many computing and data processing machines of the type which print data on forms utilize a punched or perforated tape for controlling movement of the forms through the printer section of the machine in a predetermined manner. The perforated tape is read mechanically or photoelectrically to signal the desired movement and positioning of the form being printed. Such form control tapes may be perforated only at certain points to index a form for printing thereon. Also, it is important for satisfactory results that the perforations be of a certain diameter. In order to determine the locations where a form control tape must be perforated, it is necessary, for example, to locate the lines of the form to be printed. The form control tape must be perforated at the same distances from a reference line on the tape as said lines are spaced from a corresponding reference line on the form. Distances from the reference lines are commonly measured by counting lines printed on the form and corresponding lines printed on the tape. This manner of determining the positions where the form control tape is to be perforated is very cumbersome and time consuming, and often results in misplaced perforations in the tape. Further, the perforating is generally accomplished with a hand punch. This has many disadvantages. For example, many hand punches leave a rough edge or do not cut completely around the periphery of the hole, leaving the material to be punched out hanging to the body of the form control tape. Also, when using a hand punch, it is difficult to accurately punch a hole at a predetermined location.

It is an object of this invention to provide a method and apparatus for quickly and accurately locating the positions where a form control tape must be perforated for controlling the movement of a form through the printer section of a computing or data processing machine in a predetermined manner.

Another object of this invention is to provide a method and apparatus for quickly and accurately perforating such a form control tape at the predetermined locations.

A further object of this invention is to provide a method and apparatus for punching holes in such a tape which have smooth edges.

Further objects and advantages of my invention will appear as this specification progresses.

According to the present invention a die is utilized for perforating the form control tape as described above. A transparent guide plate is provided for holding a form control tape and sample form of the type which said tape is to control on the die. The form control tape overlies the sample form with corresponding horizontal reference lines on the form control tape and sample form aligned. The die and guide plate have a plurality of axially aligned apertures located along the path occupied by the form control tape and corresponding to every position where the form control tape may be perforated for signalling desired movement and positioning of a form in the printer section of the computing or data processing machine. Thus, a clear visual representation of the vertical location where the form control tape must be perforated is presented. The form control tape is then perforated by pressing a punch rod through an aperture in the guide plate, the form control tape, sample form and corresponding aperture in the die. Clean cutting and accurate hole location result.

Referring to the accompanying drawings.

Figures 1, 2, 3:
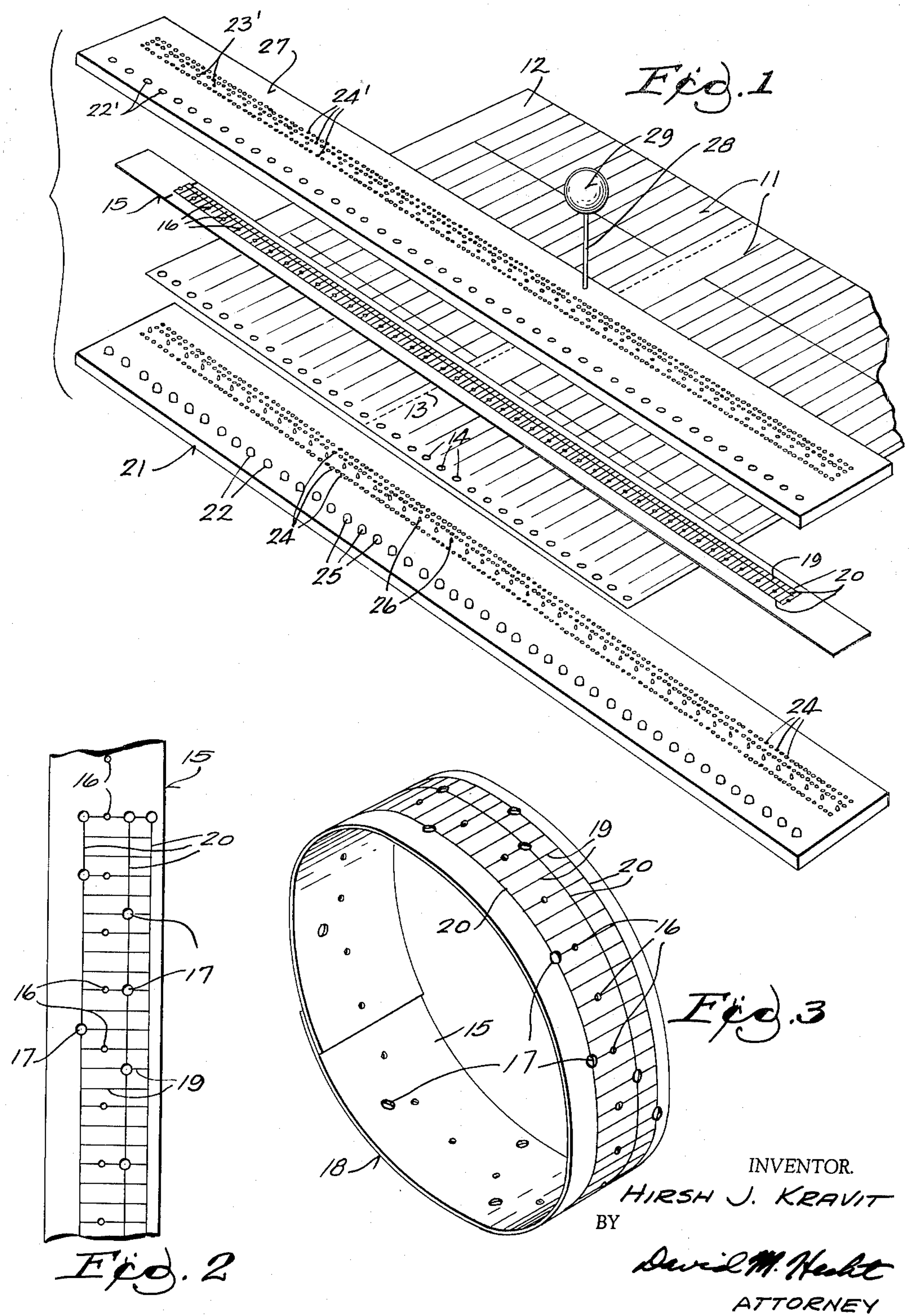
FIG. 1 is a perspective view of the die, fragment of a sample form, form control tape to be perforated, guide plate and punch rod shown in spaced relation.
FIG. 2 is a plan view of a fragment of a perforated form control tape.
FIG. 3 is a perspective view of a perforated form control tape which has been formed in a loop.

Certain computing and data processing machines print data on a variety of different business forms such as designated by the numeral 11. The forms 11 are provided in a continuous strip 12 being separable along perforations, as at 13. The strip 12 is provided with sprocket holes 14 to permit it to be driven through the printing section of the computing or data processing machine by sprockets. Each individual form 11 in the strip 12 must be positioned as it passes through the printer section of the machine to permit printing on predetermined lines thereof. The movement of the strip 12 through the printer section of the machine is controlled in many such computing and data processing machines by a form control tape 15. The form control tape 15 is provided with sprocket holes 16 and must be perforated, as at 17, to signal movement and positioning of the strip 12 of forms 11 for printing thereon. Once the form control tape 15 has been perforated it is formed in a loop 18 and driven by means of sprockets engaging the sprocket holes 16 and is read mechanically or photoelectrically. The loop 18 has a peripheral dimension equal to the length of a form 11. It is sometimes desirable to control more than one form 11 in each revolution of the loop 18 in which case its peripheral dimension will equal such number of forms 11.

Only perforations 17 at certain positions on the form control tape 15 are effective in controlling movement and positioning of the strip 12 of forms 11 for printing thereon. Markings are generally provided on the form control tape 15 designating these positions although it will become apparent as this description progresses that the present invention obviates the necessity for most of said markings. In the form control tape 15 shown in the accompanying drawings, the intersections of the horizontal lines 19 and vertical lines 20 designate the possible locations of perforations, as at 17. The vertical positions of the horizontal lines 19 correspond to like vertical positions on the form 11. If printing is to occur on a given line of the form 11, say six inches from the top thereof, perforations, as at 17, must be centered on a horizontal line 19 which is six inches below a reference line on the form control tape 15 corresponding to the top of the form 11. The vertical lines 20 correspond to the positions of the sensing devices which read the form control tape 15. Thus, perforations may be located at one or more of three different positions on a given horizontal line 19. Different locations and combinations of perforations 17 on a given horizontal line 19 are used to signal various information, such as when the last line desired to be printed on a form 11 has been reached.

According to the present invention, a die 21 is utilized in perforating the form control tape 15. The die 21 is of flat, rectangular shape and may be made of any suitable material, preferably a relatively high carbon tool steel. The die 21 is provided with three sets of apertures 22, 23 and 24. The apertures 22 are positioned on a vertical line and are spaced the same distance, center to center, as the sprocket holes 14 in the form 11 and have fitted therein pins 25 which project above the die 21. The apertures 23 are also positioned on a vertical line and are spaced, center to center, at the same distance as the sprocket holes 16 in the form control tape 11. Pins 26 terminating in relatively sharp points are fitted in said apertures 23 with their points projecting above the die 21. The third set of apertures 24 are positioned along three vertical lines adjacent the line along which the apertures 23 are located and are of a diameter equal to the diameter of the perforations 17 to be punched in the form control tape 11.

A guide plate 27 is also utilized in the perforating operation, although it is possible to perform the operation without it. The guide plate 27 is a flat piece of transparent material of substantially the same length and width as the die 21. Further, it is provided with three sets of apertures 22′, 23′ and 24′ corresponding to the apertures 22, 23 and 24 in the die 21. Thus, the guide plate 27 may be placed on the die 21 with the pins 25 and 26 engaging the apertures 22′ and 23′ in the die 21 and the apertures 24 and 24′ of the die 21 and guide plate 27, respectively, in axial alignment.

Figures 4, 5, 6, 7, 8:
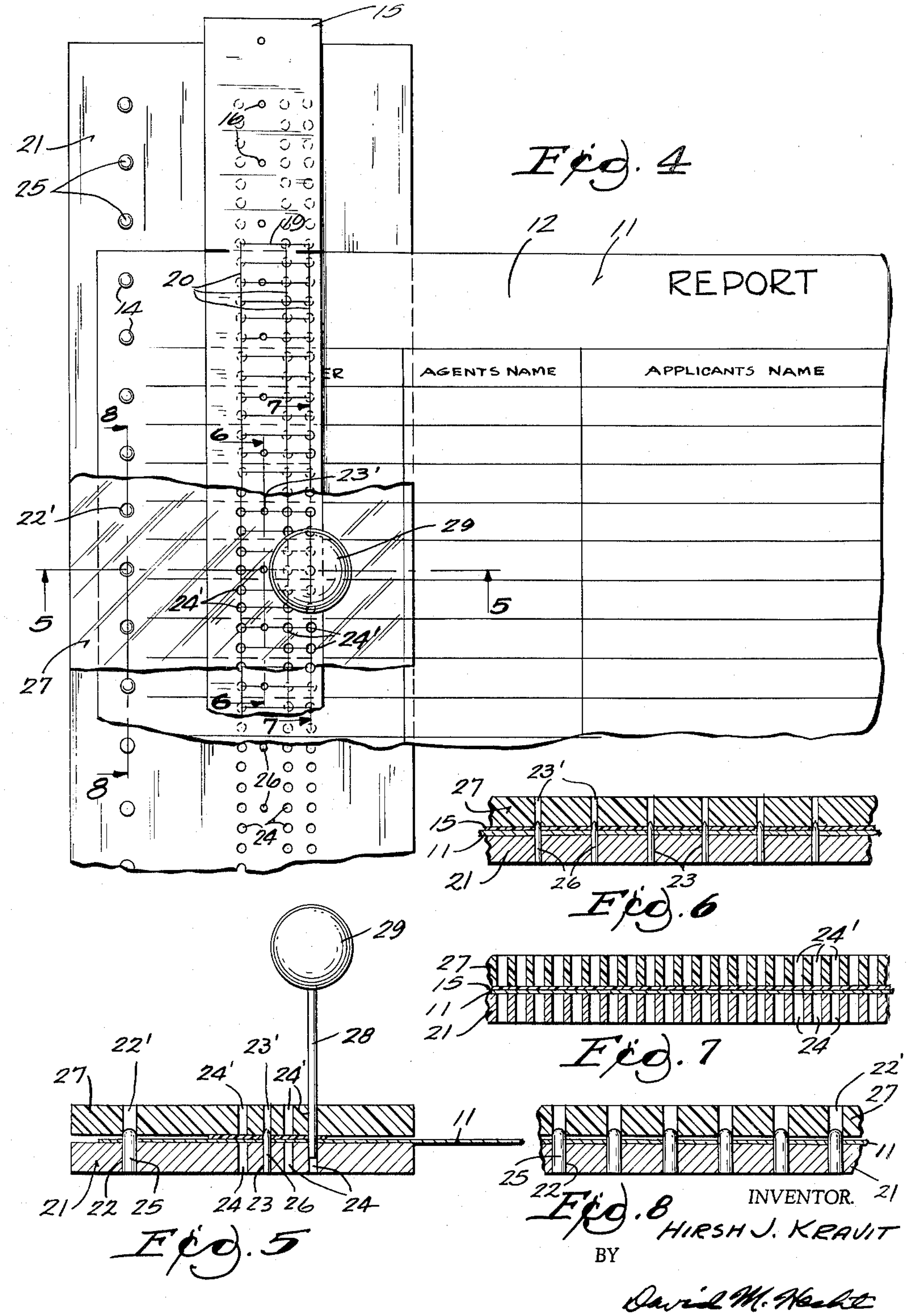
FIG. 4 is a plan view showing a fragment of the die, sample form, form control tape and guide plate and punch rod in alignment for perforating.
FIG. 5 is a fragmentary sectional view taken along line 5—5 of FIG. 4.
FIG. 6 is a fragmentary sectional view taken along line 6—6 of FIG. 4.
FIG. 7 is a fragmentary sectional view taken along line 7—7 of FIG. 4.
FIG. 8 is a fragmentary sectional view taken along line 8—8 of FIG. 4.

In operation a form 11 of the type which is to be printed by the computing or data processing machine is placed on the die 21 with the pins 25 projecting through the sprocket holes 14 and the pins 26 piercing the form 11. The sets of apertures 22 and 23 in the die 21 are in such relation to each other that a form control tape 15 may then be placed over the form 11 with the pins 26 engaging its sprocket holes 16 and with corresponding horizontal reference lines on the form control tape 15 and form 11 aligned. As shown in FIG. 4, alignment is accomplished by means of horizontal markings on the form control tape 15 corresponding to the top edge of the form 11. Further, with the form 11 and form control tape 15 positioned in this manner, the apertures 24 in the die 21 are centered directly below the intersections of the vertical and horizontal lines 19 and 20 of the form control tape 15, or as explained above, at each location where the form control tape 15 may be perforated. The guide plate 27 is then placed on the die 21 with the pins 25 and 26 engaging the apertures 22 and 23, respectively, of the guide plate 27. It is thus possible for the operator to see exactly the vertical location on the form control tape 15 where perforations 17 are to be located, since the form control tape 15 and form 11 are in exact vertical alignment.

The perforating of the form control tape 15 is accomplished with a punch rod 28. It is of slightly smaller diameter than the apertures 24 and 24′ of the die 21 and guide plate 27 and is provided with a handle or knob 29. To perforate the form control tape 15 at a particular location, the punch rod 28 is inserted in the aperture 24′ in the guide plate 27 at such location and pressed through the corresponding aperture 24 in the die 21, thereby perforating both the form control tape 15 and form 11 at said location. The form 11 which is perforated simultaneously with the form control tape 15 may be subsequently utilized as a guide in perforating additional form control tapes by positioning a tape to be perforated on the die 21 and placing said perforated form 11 over it.

Since many possible embodiments may be made in the invention and many changes might be made in the embodiment herein shown and described, as will appear to those skilled in the art, it is to be understood that the foregoing is to be interpreted as illustrative and not in a limiting sense.

What I claim is:

1. The method of perforating a tape for controlling longitudinal movement of forms during printing thereon by a data processing or computing machine or the like, said tape being of the type which must be perforated at centers horizontally aligned with corresponding vertically spaced positions on said sample form; said method comprising positioning on a die a sample form of the type to be printed, positioning a tape to be perforated overlying said sample form with corresponding transverse reference lines on said sample form and said tape aligned, said die having a plurality of apertures, one of said apertures at each vertically spaced location where said tape may be perforated, and selectively perforating said tape at the said vertically spaced positions required to control longitudinal movement in the desired manner of the forms to be printed with a rod having a cross section slightly smaller than the size of said apertures.

2. The method of perforating a tape for controlling longitudinal movement of forms during printing thereon by a data processing or computing machine or the like, said tape being of the type which must be perforated at centers horizontally aligned with corresponding vertically spaced positions on said sample form; said method comprising positioning a sample form of the type to be printed and a tape to be perforated between a die and guide means with corresponding transverse reference lines on said sample form and said tape aligned and with said tape overlying said sample form, said die having a plurality of apertures, one of said apertures at each vertically spaced location where said tape may be perforated, and said guide means having a plurality of apertures coaxial with said apertures in said die, and selectively perforating said tape at the said vertically spaced positions required to control longitudinal movement in the desired manner of the forms to be printed with a rod having a cross section slightly smaller than the size of said apertures in said die and said guide means.

3. Apparatus for perforating a tape for controlling longitudinal movement of forms during printing thereon by a data processing or computing machine or the like, said forms and said tape being of the type having sprocket holes along lines extending longitudinally thereof, comprising a die having a first plurality of projections thereon for registration with the sprocket holes of a sample form of the type to be printed, a second plurality of projections thereon for registration with the sprocket holes of a tape to be perforated, said first and second pluralities of projections being in laterally spaced relation and positioned relative to each other to permit alignment of corresponding transverse reference lines on said sample form and said tape, and a plurality of apertures therein, one of said apertures at each location where a tape positioned as aforesaid may be perforated; a transparent plate having a plurality of openings therein for registration with said first and second pluralities of projections on said die and a plurality of apertures therein coaxial with said apertures in said die; and a rod having a cross section slightly smaller than the size of said apertures in said die and said transparent plate for perforating said tape at the desired of said locations.

4. Apparatus for perforating a tape for controlling longitudinal movement of forms during printing thereon by a data processing or computing machine or the like, said forms and said tape being of the type having sprocket holes along lines extending longitudinally thereof, comprising a die having a first plurality of projections thereon for registration with the sprocket holes of a sample form of the type to be printed, a second plurality of projections thereon for registration with the sprocket holes of a tape to be perforated, said first and second pluralities of projections being in lateraly spaced relation and positioned relative to each other to permit alignment of corresponding transverse reference lines on said sample form and said tape, and a plurality of apertures therein, one of said apertures at each location where a tape positioned as aforesaid may be perforated: and a rod having a cross section slightly smaller than the size of said apertures in said die for perforating said tape at the desired of said locations.

5. Apparatus for perforating a tape for controlling longitudinal movement of forms during printing thereon by a data processing or computing machine or the like, said forms and said tape being of the type having sprocket holes along lines extending longitudinally thereof, comprising a die having a first plurality of projections thereon for registration with the sprocket holes of a sample form of the type to be printed, a second plurality of projections thereon for registration with the sprocket holes of a tape to be perforated, said first and second pluralities of projections being in laterally spaced relation and positioned relative to each other to permit alignment of corresponding transverse reference lines on said sample form and said tape, and a plurality of apertures therein, one of said apertures at each location where a tape positioned as aforesaid may be perforated; a plate having a plurality of apertures therein coaxial with said apertures in said die; and a rod having a cross section slightly smaller than the size of said apertures in said die and said plate for perforating said tape at the desired of said locations.

References Cited by the Examiner

UNITED STATES PATENTS

| | | | |
|---|---|---|---|
| 1,310,420 | 7/1919 | Klugh | 234—2 |
| 1,871,597 | 8/1932 | English | 225—93 |
| 2,557,797 | 6/1951 | Rand | 83—451 |
| 2,730,173 | 1/1956 | Brescka | 83—413 |
| 2,833,350 | 5/1958 | Merkur | 83—451 |
| 3,075,759 | 1/1963 | Kowaleski | 225—93 |
| 3,169,434 | 2/1965 | Westerfield | 83—565 |

ANDREW R. JUHASZ, *Primary Examiner.*